(12) United States Patent
Caverly

(10) Patent No.: US 9,616,848 B2
(45) Date of Patent: Apr. 11, 2017

(54) LOCKING ASSEMBLY FOR VEHICLE STEERING COLUMN AND METHOD OF MANUFACTURING

(71) Applicant: Steering Solutions IP Holding Corporation, Saginaw, MI (US)

(72) Inventor: Jacob Allen Caverly, Freeland, MI (US)

(73) Assignee: STEERING SOLUTIONS IP HOLDING CORPORATION, Saginaw, MI (US)

( * ) Notice: Subject to any disclaimer, the term of this patent is extended or adjusted under 35 U.S.C. 154(b) by 61 days.

(21) Appl. No.: 14/826,352

(22) Filed: Aug. 14, 2015

(65) Prior Publication Data

US 2017/0043746 A1  Feb. 16, 2017

(51) Int. Cl.
*B60R 25/023* (2013.01)
*B60R 25/021* (2013.01)

(52) U.S. Cl.
CPC ...... *B60R 25/02134* (2013.01); *B60R 25/023* (2013.01)

(58) Field of Classification Search
CPC .............. B60R 25/023; B60R 25/021; B60R 25/02105; B60R 25/02134; B60R 25/02107
See application file for complete search history.

(56) References Cited

U.S. PATENT DOCUMENTS

| 1,487,863 | A  | * | 3/1924  | Lavigne    | B60R 25/02134 |
|-----------|----|---|---------|------------|---------------|
|           |    |   |         |            | 70/183        |
| 6,094,951 | A  | * | 8/2000  | Cusati     | B60R 25/02107 |
|           |    |   |         |            | 464/179       |
| 7,562,548 | B1 | * | 7/2009  | Cymbal     | B60R 25/02107 |
|           |    |   |         |            | 70/186        |
| 9,266,502 | B2 | * | 2/2016  | Suemasu    | B60R 25/021   |
| 2004/0040354 | A1 | * | 3/2004 | Linkenbach | B60R 25/02107 |
|           |    |   |         |            | 70/186        |
| 2007/0235246 | A1 | * | 10/2007 | Kawaike   | B60R 25/02105 |
|           |    |   |         |            | 180/443       |
| 2010/0077808 | A1 | * | 4/2010 | Maeda      | B60R 25/02107 |
|           |    |   |         |            | 70/187        |
| 2015/0166008 | A1 | * | 6/2015 | Suemasu    | B60R 25/021   |
|           |    |   |         |            | 74/492        |

FOREIGN PATENT DOCUMENTS

JP       2010105653 A  *  5/2010

* cited by examiner

*Primary Examiner* — Drew Brown
(74) *Attorney, Agent, or Firm* — Cantor Colburn LLP

(57) ABSTRACT

A locking assembly for a vehicle steering column includes a shaft. Also included is a slip ring having a plurality of apertures defined by a plurality of aperture walls, each of the aperture walls having a corner, the slip ring surrounding at least a portion of the shaft. Further included is a lock sleeve surrounding at least a portion of the slip ring, at least one of the corners of the plurality of aperture walls frictionally engaging one of an outer surface of the shaft and an inner surface of the lock sleeve to establish a fixed interface on a first side of the slip ring, the slip ring having a second side that establishes a slip interface with one of the shaft and the lock sleeve.

18 Claims, 2 Drawing Sheets

LOCKING ASSEMBLY FOR VEHICLE STEERING COLUMN AND METHOD OF MANUFACTURING

BACKGROUND OF THE INVENTION

The embodiments described herein relate to vehicle steering columns and, more particularly, to a locking assembly for vehicle steering columns, as well as a method of manufacturing the locking assembly.

Lock assemblies are employed with steering column assemblies for anti-theft purposes, among others. Some lock assemblies include a shaft surrounded by a lock sleeve. The lock sleeve includes detents that accommodate engagement of a pin or the like within one of the detents to prevent rotation of a steering column shaft line, and therefore a steering wheel. One or more intermediate components, such as one or more rings, are disposed between the shaft and the lock sleeve to establish a slip clutch that provides a "fusible link" of the components. Upon engagement of the pin or the like within one of the detents, the lock sleeve is prevented from rotating based on friction between the components of the lock assembly. However, if a torque is applied to the steering wheel, and hence the steering column shaft line, above a threshold torque, the interface between the intermediate component (e.g., ring) and the shaft begins to slip. This avoids damage to the steering column.

Unfortunately, some lock assemblies exhibit inconsistency and unpredictability based on slippage at different torque values. It is important to maintain a reliable and predictable torque at which slippage occurs. The undesirable drawbacks are exacerbated when the shaft is formed of certain materials, such as aluminum, for example.

SUMMARY OF THE INVENTION

According to one aspect of the disclosure, a locking assembly for a vehicle steering column includes a shaft. Also included is a slip ring having a plurality of apertures defined by a plurality of aperture walls, each of the aperture walls having a corner, the slip ring surrounding at least a portion of the shaft. Further included is a lock sleeve surrounding at least a portion of the slip ring, at least one of the corners of the plurality of aperture walls frictionally engaging one of an outer surface of the shaft and an inner surface of the lock sleeve to establish a fixed interface on a first side of the slip ring, the slip ring having a second side that establishes a slip interface with one of the shaft and the lock sleeve.

According to another aspect of the disclosure, a steering wheel rotational control assembly includes a steering column comprising a column lock pin. Also included is a locking assembly for preventing rotation below a threshold torque applied to the steering column and allowing rotation above a threshold torque. The locking assembly includes a shaft. The locking assembly also includes a slip ring having a plurality of apertures defined by a plurality of aperture walls, each of the aperture walls having a corner, the slip ring surrounding at least a portion of the shaft. The locking assembly further includes a lock sleeve surrounding at least a portion of the slip ring, at least one of the corners of the plurality of aperture walls frictionally engaging one of an outer surface of the shaft and an inner surface of the lock sleeve to establish a fixed interface on a first side of the slip ring, the slip ring having a second side that establishes a slip interface with one of the shaft and the lock sleeve, the lock sleeve having an outer surface with a plurality of detents configured to engage the column lock pin to lock the steering column below the threshold torque and to allow rotation above the threshold torque.

According to yet another aspect of the disclosure, a method of manufacturing a locking assembly for a vehicle steering column is provided. The method includes forming a plurality of apertures in a slip ring, each of the plurality of apertures defined by at least one aperture wall having a corner. The method also includes disposing the slip ring around a shaft. The method further includes disposing a lock sleeve around the slip ring. The method yet further includes pressing the lock sleeve, the slip ring and the shaft together to frictionally engage at least one of the corners of the slip ring with one of an outer surface of the shaft and an inner surface of the lock sleeve to establish a fixed interface on a first side of the slip ring and a slip interface between the slip ring and one of the shaft and the lock sleeve.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Referring now to the Figures, where the invention will be described with reference to specific embodiments, without limiting same, a lock assembly for a vehicle steering column is provided to reliably dictate a slip interface and a fixed interface by "digging" a mechanical feature into a surface of an adjacent component to prevent slippage at that interface, as will be appreciated from the disclosure herein.

Figure 1:
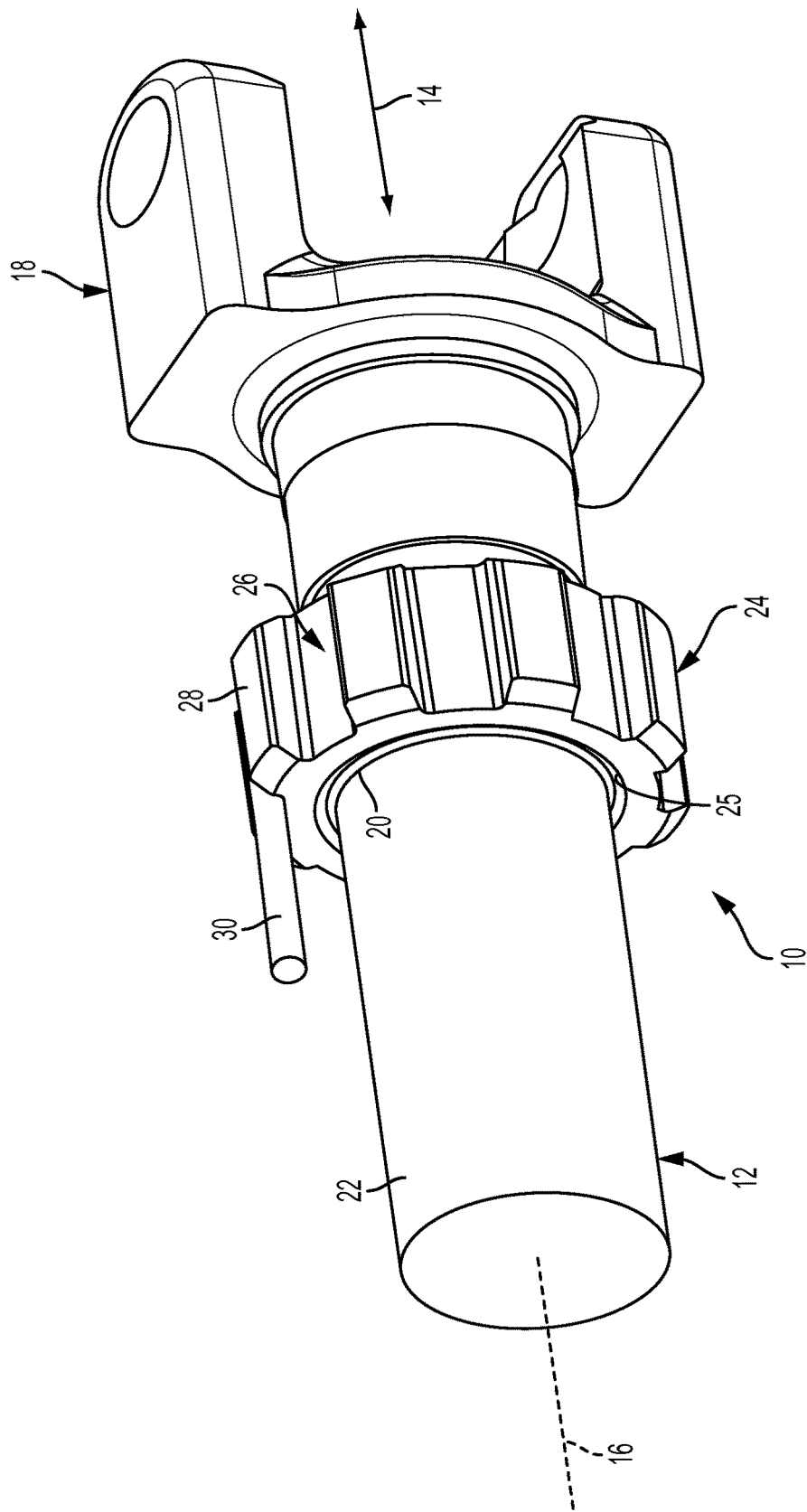
FIG. 1 is a perspective view of a lock assembly for a vehicle steering column.

Referring now to FIG. 1, the lock assembly is illustrated and generally referenced with numeral 10. The lock assembly 10 includes a shaft 12 that extends in a longitudinal direction 14 about a central axis 16. The shaft 12 is operatively coupled to a steering column shaft line (not shown). In the illustrated embodiment, the shaft 12 is coupled to the steering column shaft line via a bracket 18 or the like. A slip ring 20 circumferentially surrounds at least a portion of the shaft 12. More particularly, the slip ring 20 surrounds an outer surface 22 of the shaft 12 and is in contact therewith. Disposed radially outwardly of the slip ring 20, and circumferentially surrounding the slip ring 20, is a lock sleeve 24. An inner surface 25 of the lock sleeve 24 is in contact with the slip ring 20.

The lock sleeve 24 includes at least one, but typically a plurality of detents 26 circumferentially spaced from each other along an outer surface 28 of the lock sleeve 24. The detents 26 are dimensioned to receive a steering column lock pin 30 therein to engage the lock assembly 10 with the steering column to prevent rotation of the steering column shaft line, and therefore the steering wheel. The prevention of rotation is facilitated by the frictional engagement of the static shaft 12, the slip ring 20 and the lock sleeve 24. This feature is enabled during certain operating conditions of the vehicle, such as an anti-theft condition that inhibits a thief's ability to directionally control the vehicle. However, it is undesirable to incur damage to the vehicle, such as the steering column, if an operator applies a significant torque in the locked condition. Therefore, the locked condition is maintained by the lock assembly 10 only up to a threshold torque that will depend upon the particular application. If a torque is applied that exceeds the threshold torque, the lock assembly 10 is configured to allow the lock sleeve 24 to rotate relative to the shaft 12 in response to the applied torque.

As discussed above, two interfaces are established by the components of the lock assembly 10. It is contemplated that more intermediate components may be present to define more interfaces, but in the illustrated embodiment a first interface is defined by contact between the slip ring 20 and the shaft 12 and a second interface is defined by contact between the slip ring 20 and the lock sleeve 24. Different friction (and slip) characteristics may be present at the two interfaces due to material choice, moments due to radial locations of the interfaces, etc. The embodiments described herein ensure that one of the interfaces is a fixed interface that prevents relative rotation between the components that define the interface and the other interface is a slip interface that allows relative rotation between the components that define the interface when a torque is applied that exceeds the threshold torque.

Figure 2:
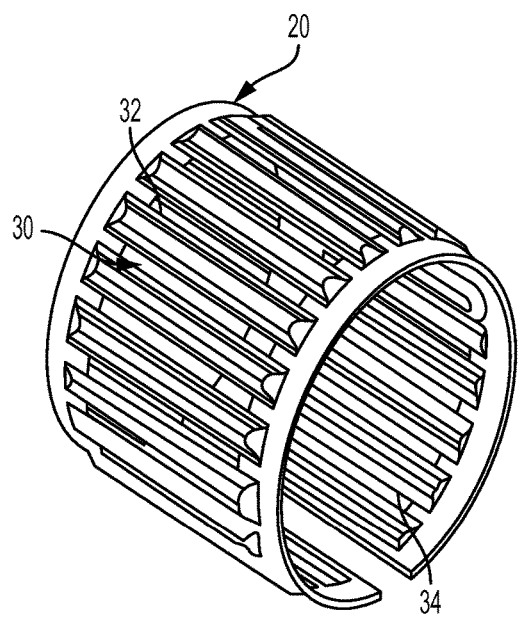
FIG. 2 is a perspective view of a slip ring of the lock assembly.

Referring now to FIG. 2, the slip ring 20 is illustrated in greater detail. The slip ring 20 includes a plurality of apertures 30 defined by a plurality of aperture walls 32. The apertures 30 may be formed in any suitable manner, such as by punching or piercing material from a relatively cylindrical initial structure. Alternatively, the slip ring 20 may be formed initially with the apertures 30 via a stamping and rolling process. Regardless of the precise method of manufacture, each of the aperture walls 32 are geometrically shaped to form a corner 34 (FIG. 4) that is defined by a sharp angle. In the illustrated embodiment, the apertures 30 are circumferentially spaced from each other around the slip ring 20 and extend axially in the longitudinal direction 14 of the shaft 12 to be oriented substantially parallel to the central axis 16 of the shaft 12. Alternatively, the apertures 30 may be axially spaced from each other along the slip ring 20 and extend circumferentially to orient the apertures substantially perpendicular to the central axis 16 of the shaft 12. In yet another configuration, the apertures 30 may be oriented at some angle between parallel and perpendicular to the central axis 16 of the shaft 12. It is to be further appreciated that any combination of the above-described aperture orientations may be employed.

Figure 3:
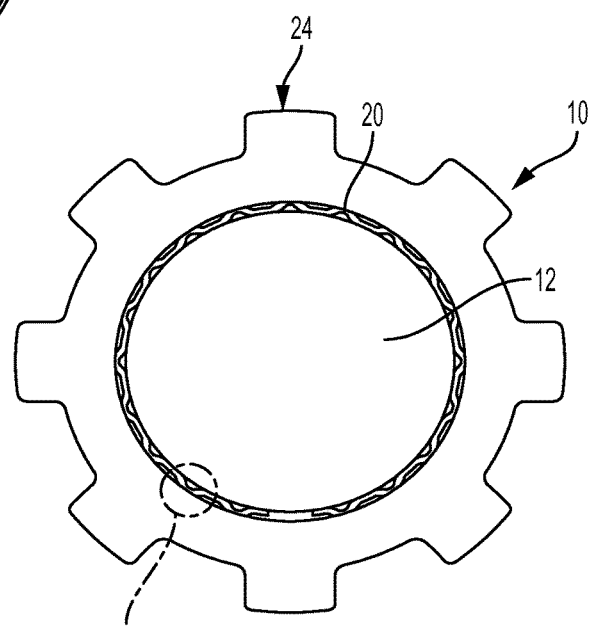
FIG. 3 is an end view of the lock assembly.
Figure 4:
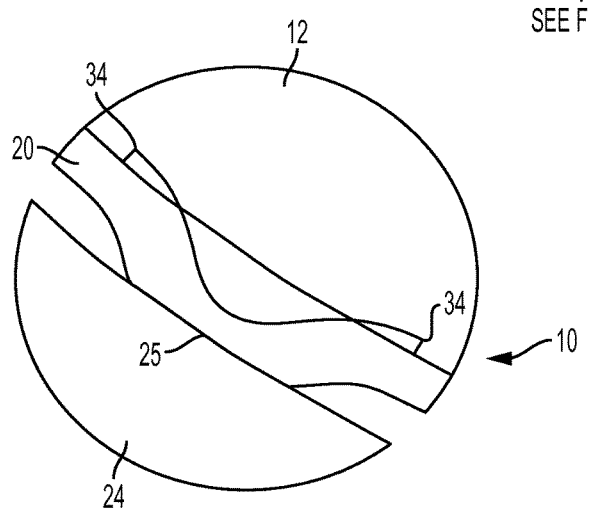
FIG. 4 is an enlarged view of section IV of FIG. 3.

Referring to FIGS. 3 and 4, the lock assembly 10 is illustrated from an end view along the central axis 16 of the shaft 12. In the enlarged view of FIG. 4, the corners 34 of the aperture walls 32 are shown in greater detail. The shaft 12, the slip ring 20 and the lock sleeve 24 are tightly engaged with each other, such as by a press fitting operation. As the components of the lock assembly 10 are pressed together, the corners 34 of the aperture walls 32 frictionally engage the shaft 12 in a staking manner by "digging" into the shaft 12. This occurs in response to a force applied radially inwardly on the outer surface 28 of the lock sleeve 24. The frictionally engaged corners 34 of the slip ring 20 establishes the above-described fixed interface and prevents relative rotation between the slip ring 20 and the shaft 12. By doing so, the interface between the slip ring 20 and the lock sleeve 24 is established as the slip interface, where slippage is permitted upon application of a torque above the threshold torque. The embodiment described above positively determines which interface is the fixed interface and which is the slip interface.

Alternatively, it is contemplated that the slip ring 20 may be configured such that the corners 34 of the aperture walls 32 are positioned to engage the inner surface 25 of the lock sleeve 24. Such an embodiment establishes the fixed interface as the interface defined by contact between the slip ring 20 and the lock sleeve 24. The slip interface is established as the interface defined by contact between the slip ring 20 and the shaft 12.

Irrespective of which configuration is employed, the fixed interface and the slip interface are reliably determined. By positively establishing the location of the slip interface, the threshold torque may be tuned according to the location of the slip interface. The embodiments described herein eliminate uncertainty associated with which interface will function as the slip interface during operation. This is useful when certain materials are employed as the lock assembly components. For example, embodiments having an aluminum shaft benefit from the lock assembly described herein.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A locking assembly for a vehicle steering column comprising:
   a shaft;
   a slip ring having a plurality of apertures defined by a plurality of aperture walls, each of the aperture walls having a corner, the slip ring surrounding at least a portion of the shaft; and
   a lock sleeve surrounding at least a portion of the slip ring, at least one of the corners of the plurality of aperture walls frictionally engaging one of an outer surface of the shaft and an inner surface of the lock sleeve to establish a fixed interface on a first side of the slip ring, the slip ring having a second side that establishes a slip interface with one of the shaft and the lock sleeve.

2. The locking assembly of claim 1, the shaft disposed about a central axis extending in a longitudinal direction, the plurality of apertures circumferentially spaced from each other and oriented parallel to the central axis.

3. The locking assembly of claim 1, the shaft disposed about a central axis extending in a longitudinal direction, the plurality of apertures axially spaced from each other and oriented perpendicular to the central axis.

4. The locking assembly of claim 1, wherein the shaft comprises aluminum.

5. The locking assembly of claim 1, the corners of the aperture walls staked into the outer surface of the shaft.

6. The locking assembly of claim 5, wherein the fixed interface is between the slip ring and the shaft and the slip interface is between the slip ring and the lock sleeve.

7. The locking assembly of claim 1, the corners of the aperture walls staked into the inner surface of the lock sleeve.

8. The locking assembly of claim 7, wherein the fixed interface is between the slip ring and the lock sleeve and the slip interface is between the slip ring and the shaft.

9. The locking assembly of claim 1, wherein the fixed interface resists rotation of the lock sleeve below a threshold torque applied to the lock sleeve and the slip interface permits rotation of the lock sleeve above the threshold torque applied to the lock sleeve.

10. A steering wheel rotational control assembly comprising:
   a steering column comprising a column lock pin; and
   a locking assembly for preventing rotation below a threshold torque applied to the steering column and allowing rotation above a threshold torque, the locking assembly comprising:
      a shaft;
      a slip ring having a plurality of apertures defined by a plurality of aperture walls, each of the aperture walls having a corner, the slip ring surrounding at least a portion of the shaft; and
      a lock sleeve surrounding at least a portion of the slip ring, at least one of the corners of the plurality of aperture walls frictionally engaging one of an outer surface of the shaft and an inner surface of the lock sleeve to establish a fixed interface on a first side of the slip ring, the slip ring having a second side that establishes a slip interface with one of the shaft and the lock sleeve, the lock sleeve having an outer surface with a plurality of detents configured to engage the column lock pin to lock the steering column below the threshold torque and to allow rotation above the threshold torque.

11. The steering wheel rotational control assembly of claim 10, the shaft disposed about a central axis extending in a longitudinal direction, the plurality of apertures circumferentially spaced from each other and oriented parallel to the central axis.

12. The steering wheel rotational control assembly of claim 10, the shaft disposed about a central axis extending in a longitudinal direction, the plurality of apertures axially spaced from each other and oriented perpendicular to the central axis.

13. The steering wheel rotational control assembly of claim 10, wherein the shaft comprises aluminum.

14. The steering wheel rotational control assembly of claim 10, the corners of the aperture walls staked into the outer surface of the shaft.

15. The steering wheel rotational control assembly of claim 14, wherein the fixed interface is between the slip ring and the shaft and the slip interface is between the slip ring and the lock sleeve.

16. The steering wheel rotational control assembly of claim 10, the corners of the aperture walls staked into the inner surface of the lock sleeve.

17. The steering wheel rotational control assembly of claim 16, wherein the fixed interface is between the slip ring and the lock sleeve and the slip interface is between the slip ring and the shaft.

18. A method of manufacturing a locking assembly for a vehicle steering column comprising:
   forming a plurality of apertures in a slip ring, each of the plurality of apertures defined by at least one aperture wall having a corner;
   disposing the slip ring around a shaft;
   disposing a lock sleeve around the slip ring; and
   pressing the lock sleeve, the slip ring and the shaft together to frictionally engage at least one of the corners of the slip ring with one of an outer surface of the shaft and an inner surface of the lock sleeve to establish a fixed interface on a first side of the slip ring and a slip interface between the slip ring and one of the shaft and the lock sleeve.

* * * * *